H. A. HERR.
AUTOMATIC HYDRAULIC PRESS.
APPLICATION FILED JUNE 15, 1906.
1,124,738.
Patented Jan. 12, 1915
7 SHEETS—SHEET 1.
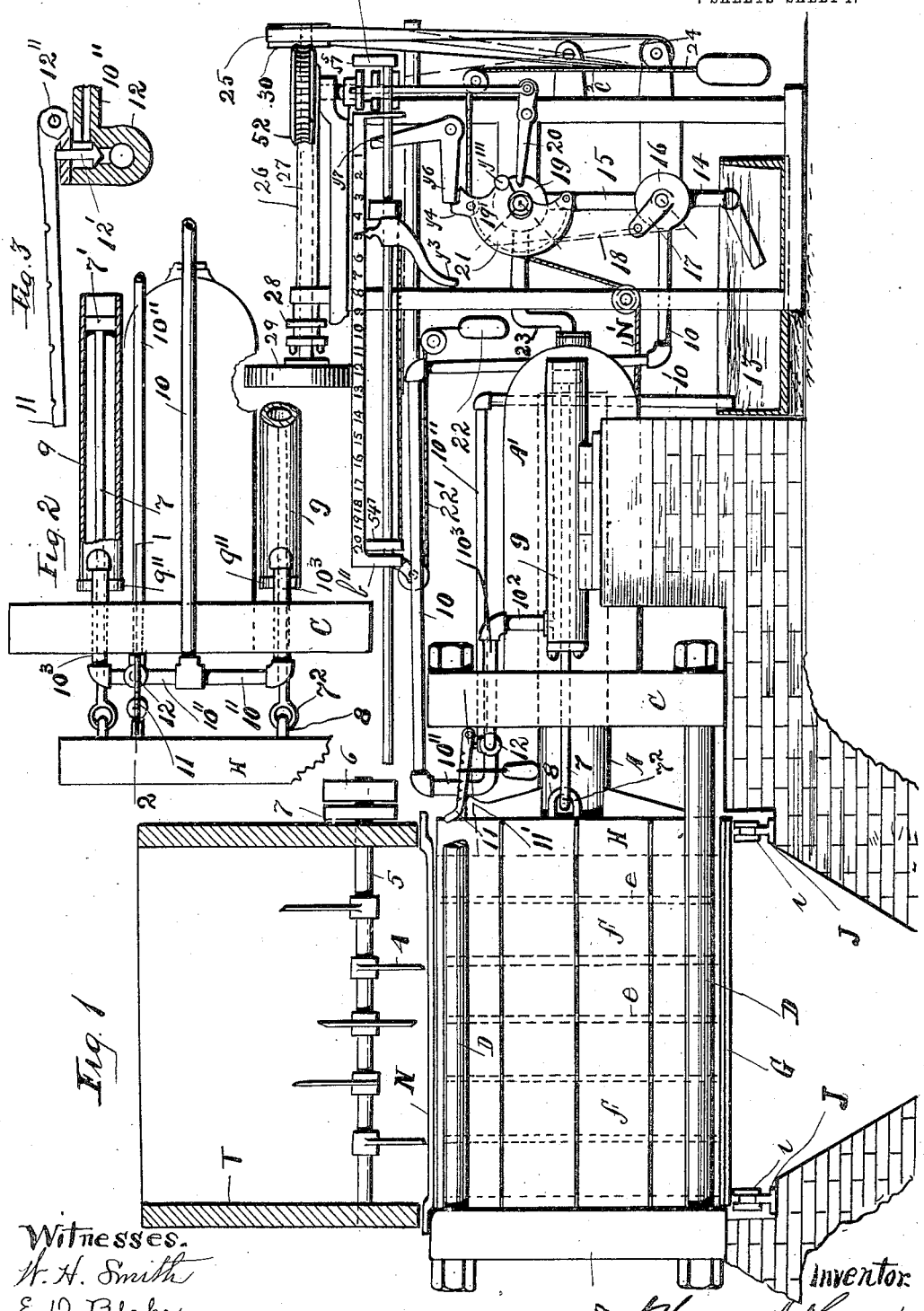
Witnesses.
W. H. Smith
E. D. Blake
Inventor.
Homer A. Herr

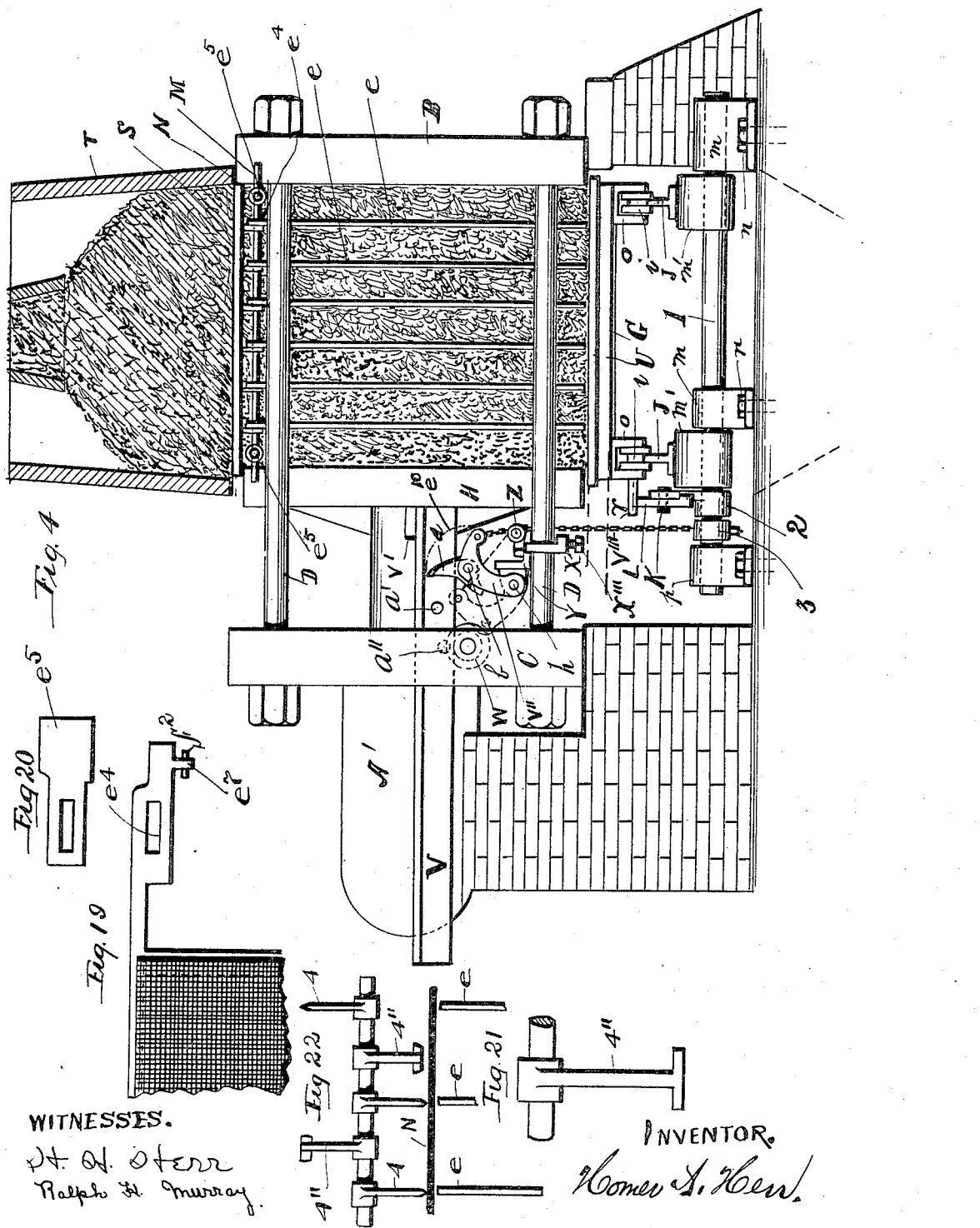

H. A. HERR.
AUTOMATIC HYDRAULIC PRESS.
APPLICATION FILED JUNE 15, 1906.
1,124,738.
Patented Jan. 12, 1915.
7 SHEETS—SHEET 3.
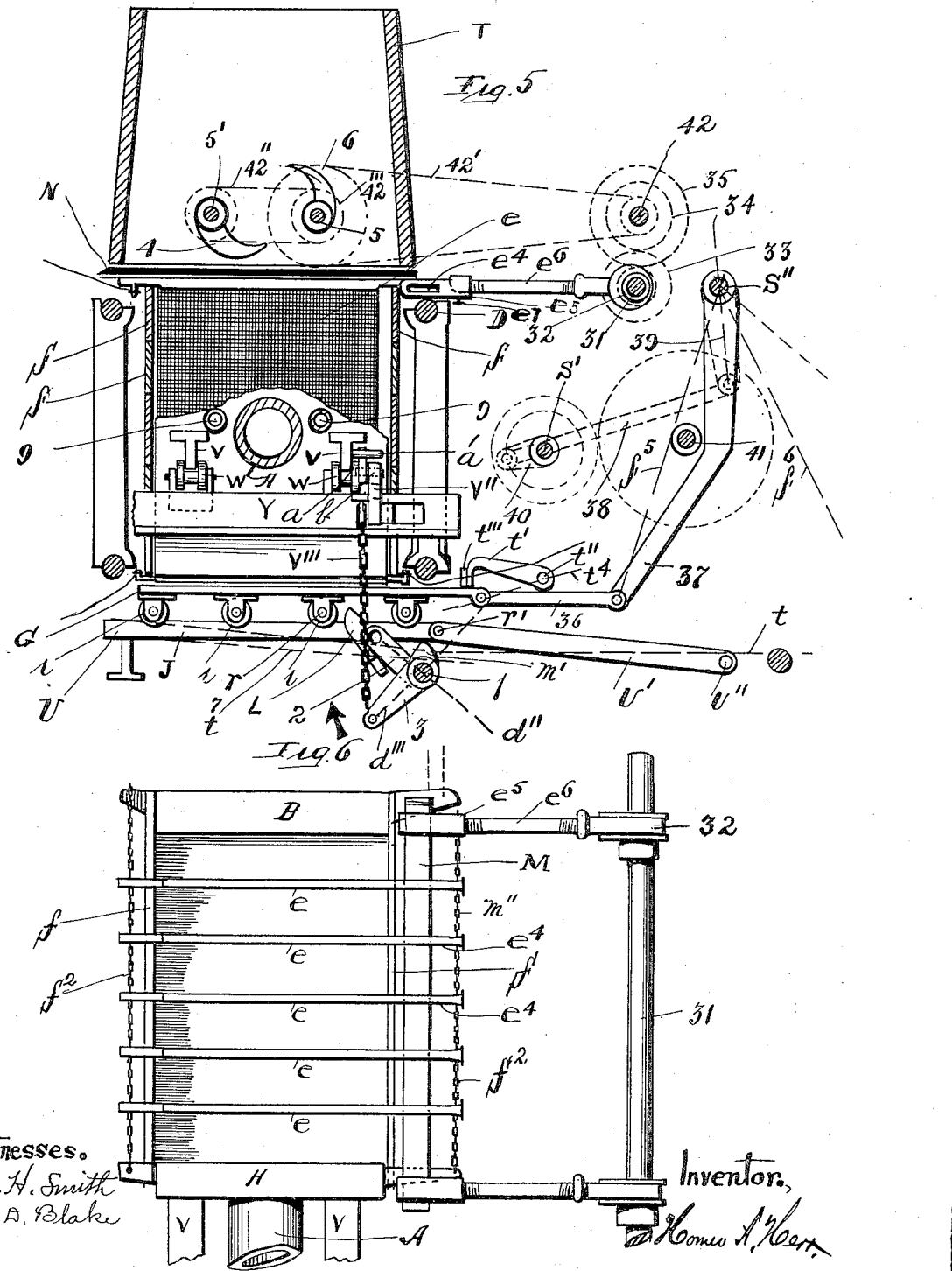

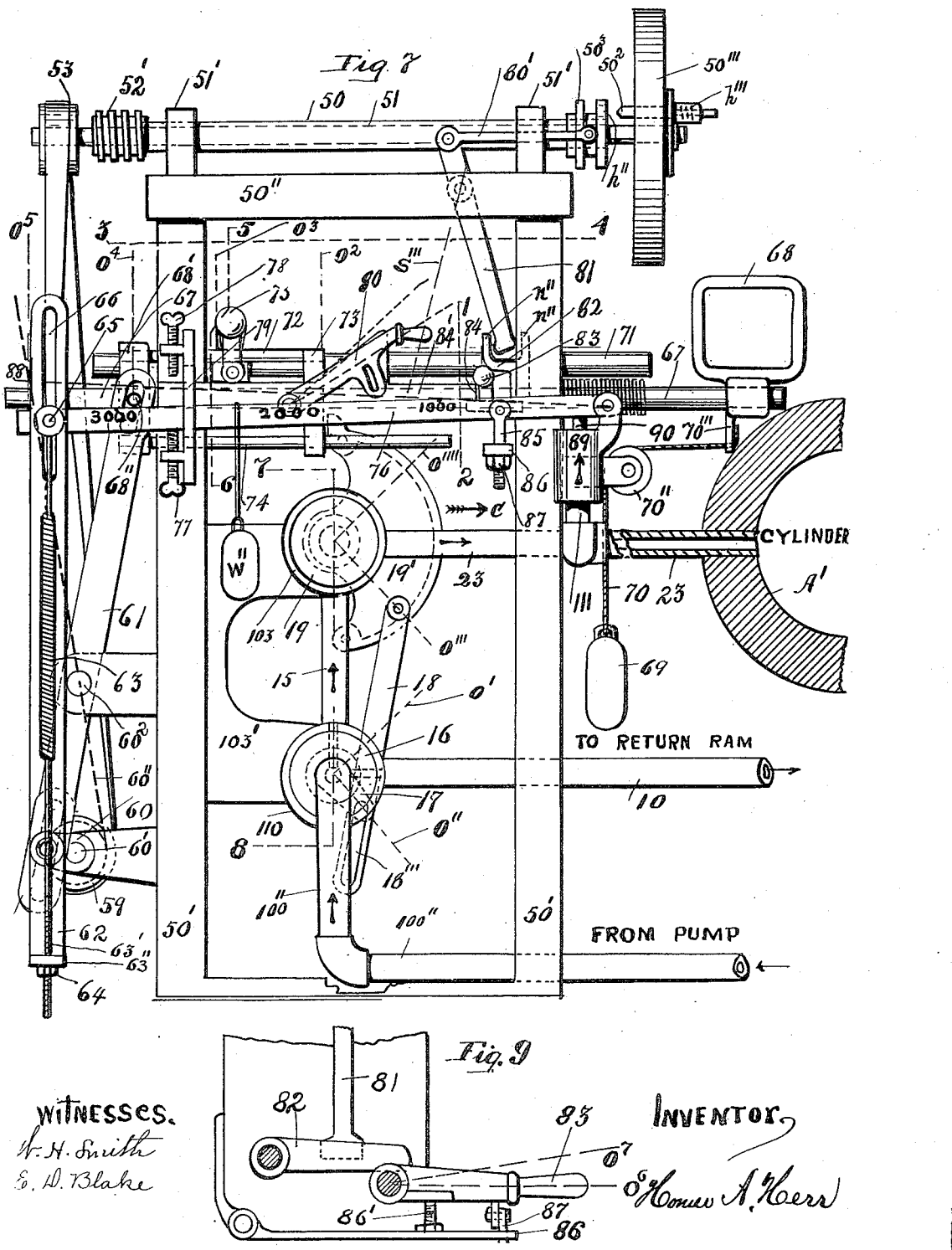

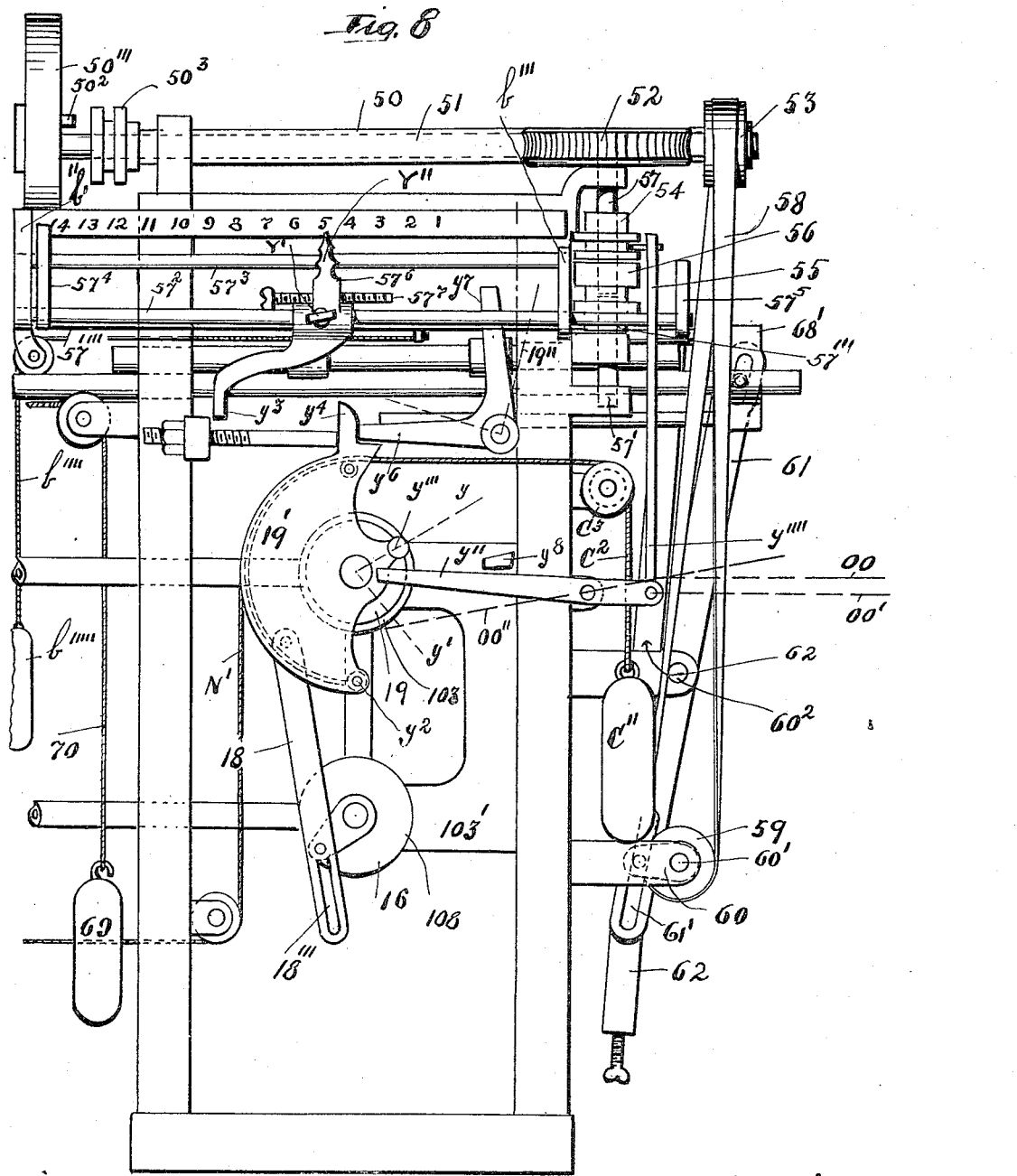

H. A. HERR.
AUTOMATIC HYDRAULIC PRESS.
APPLICATION FILED JUNE 15, 1906.
1,124,738.
Patented Jan. 12, 1915.
7 SHEETS—SHEET 6.
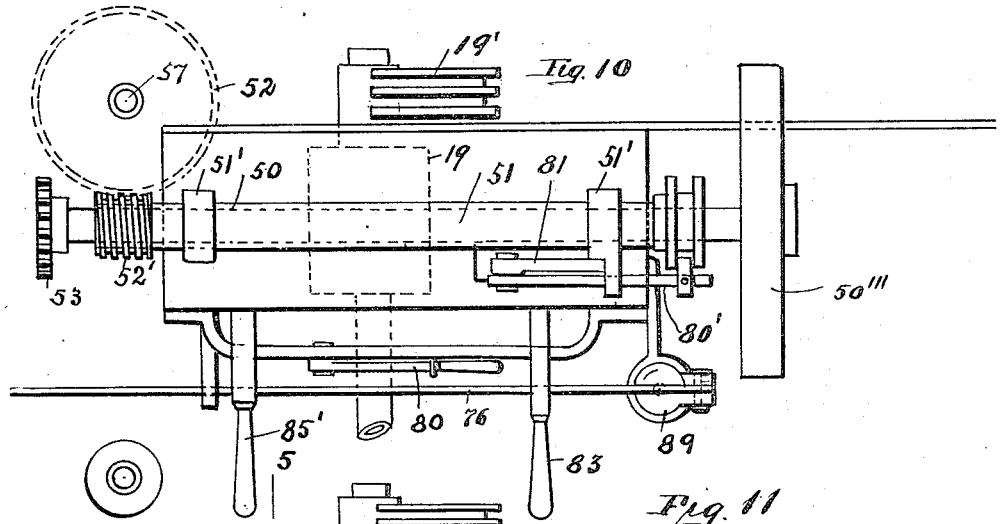
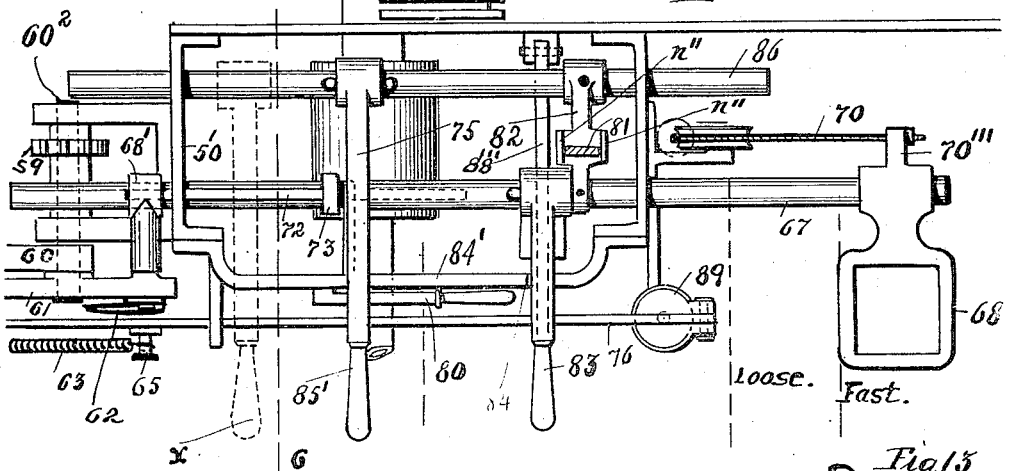
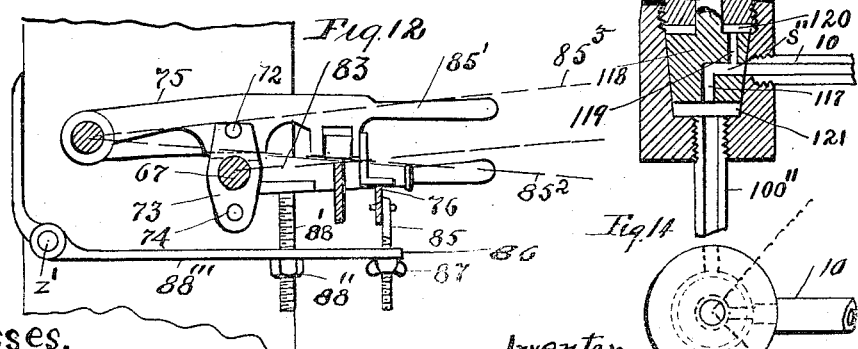

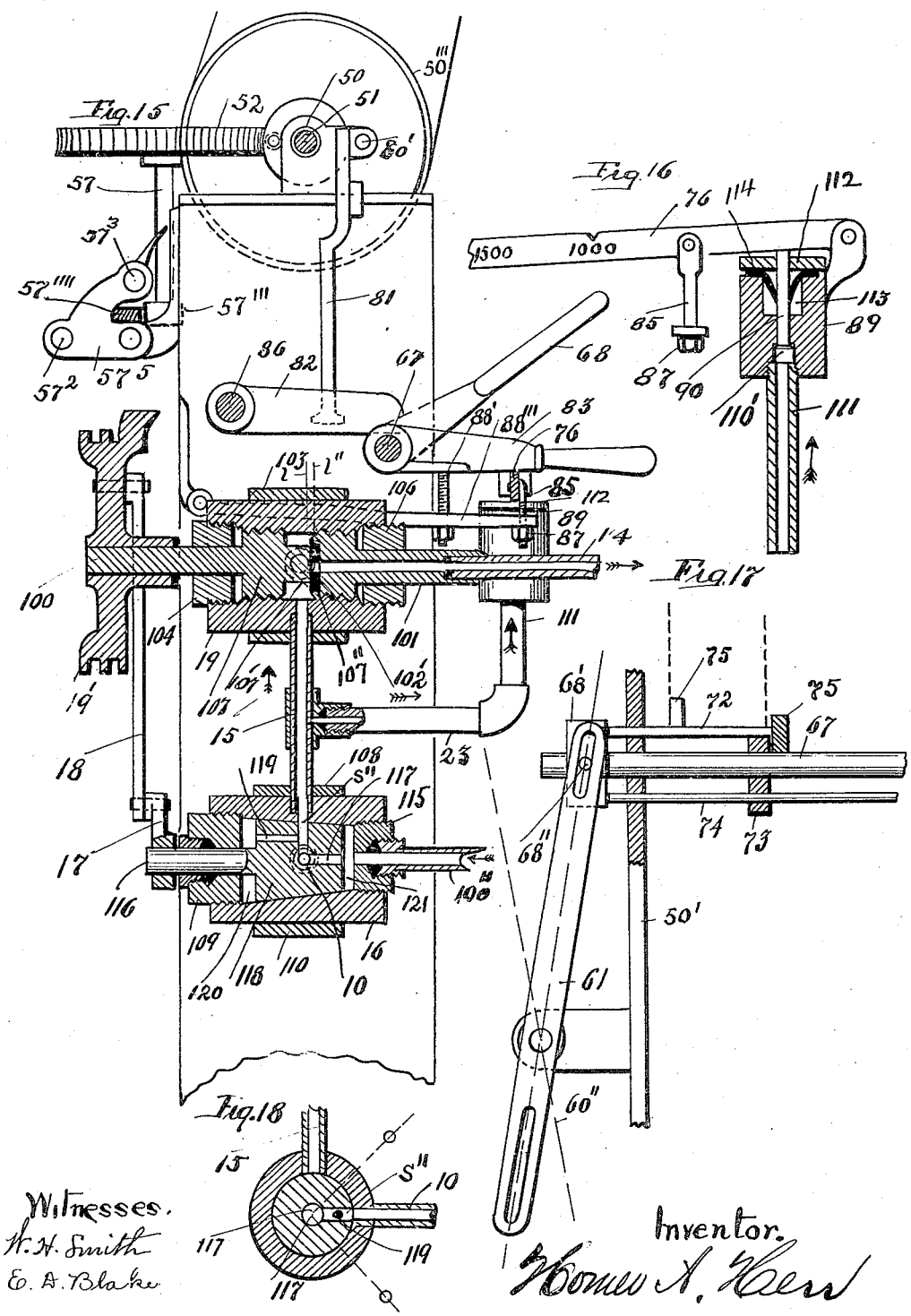

UNITED STATES PATENT OFFICE.

HOMER A. HERR, OF PHILADELPHIA, PENNSYLVANIA.

AUTOMATIC HYDRAULIC PRESS.

1,124,738.

Specification of Letters Patent.   Patented Jan. 12, 1915.

Application filed June 15, 1906. Serial No. 321,835.

*To all whom it may concern:*

Be it known that I, HOMER A. HERR, a citizen of the United States, residing at Philadelphia, in the county of Philadelphia and State of Pennsylvania, have invented certain new and useful Improvements in Automatic Hydraulic Presses, of which the following is a specification.

My invention has reference to automatic liquid extracting presses and consists of features fully set forth in the following specification and the accompanying drawing forming part thereof.

In my application filed November 6th, 1902, Serial No. 130,239, and also in my application filed October 6th, 1903, Serial No. 176,020 I show an automatic press wherein all the functions associated with the expressing of liquids by mechanical means from solids are accomplished by an automatic machine. These functions include the starting of the machine, the feeding of the chamber with material to be pressed, the discharging of the chamber after pressure of residuum, the predetermining of the maximum pressure, the predetermining of a time period for maximum pressure sustaining and other of less importance.

The present invention includes a number of features of novelty that are correlated with the essential features of the machine set out in the applications above referred to, and, among others, includes the following:

First, a means to drop the bottom of the compression chamber after the material in the chamber has been pressed and the platen is returning to its normal position. It is found in practice that this is a very essential function. The enormous amount of friction that exists by the pressure of the material on the bottom of the chamber makes the moving of this bottom a matter of difficulty, unless it is dropped, thus freeing it from the impacted residuum. While in the drawing I show this as being accomplished by the movement of the ram yet I do not limit myself to the action of the ram for the performance of this service. I might connect the bottom dropping mechanism with any other moving element of the machine without in the least departing from the spirit of my invention.

A second feature of my present invention is to sensitize the pressure sustainer and the device for regulating the maximum pressure. This consists substantially of an accumulator made in the manner of a safety valve and a continuously acting belt shifter, and a trip controlled by the pressure on the accumulator acting through a lever controlled by the pressure. Details of this mechanism will be described more at length hereinafter.

A third feature of this present invention is the mechanism for returning the ram and platen automatically by hydraulic pressure.

A fourth feature of this present invention is to provide the hopper of the machine with knives and feeders. The knives to be located directly over the partitions forming the compartments. The position of these knives is a matter of importance. They coact with the gentle reciprocation of the drainage partitions in filling uniformly the compression chamber of the machine.

In the drawings like parts are referred to by marks or figures of a corresponding kind in the different views.

Figure 1 is a side elevation of a hydraulic press with the cylinders for returning the ram and platen in position. The pressure sustainer is also partly shown in this view. Fig. 2 is a part plan showing the position of the two supplemental hydraulic cylinders for returning the ram to its normal position after maximum pressure. The liquid conductors leading to and from these cylinders are also shown and one of the said cylinders is shown in horizontal section. Fig. 3 is a vertical section through the exhaust valve in the conductor leading from the supplemental cylinders back to the reservoir from which the pump receives its water. Fig. 4 is a side view of the bottom dropping mechanism and a vertical section through the hopper. The side plates are removed from the chamber and the entire mechanism somewhat contracted longitudinally. Fig. 5 is a transverse section through the primary and secondary hydraulic cylinders, the connections for reciprocating the racks and the mechanism for actuating the bottom. Fig. 6 is a plan of a series of racks forming a series of compartments in the compression chamber, the outside chain connections and the common bar that actuates the said racks. Fig. 7 is a rear elevation of the pressure sustainer with the new features shown, detail description of which will follow later in this specification. Fig. 8 is the front view of the same with some of the features shown in the rear view omitted. Fig. 9 is a vertical section on line 1, 2 of Fig. 7 looking in the direction of the arrow C. This view is intended to show the hand controlled lock of the belt shifter. Fig. 10 is the top plan of the pressure sustainer, the valve tripping and time recording mechanism omitted, being old in my prior applications. Fig. 11 is a plan of the belt shifter device, being a section on line 3, 4 of Fig. 7, Fig. 12 is a section on line 6 of Fig. 7 and looking in the direction of the arrow C: Fig. 13 is a longitudinal section of the 90° valve and also looking in the direction of the arrow C; it being a section on the line 7, 8 of Fig. 7. Fig. 14 is a plan. Fig. 15 is a vertical section through the exhaust valve and the 90° valve. Fig. 16 is a vertical section of the valve which controls the belt shifter. Fig. 17 is a side elevation of the lever for shifting the belt and vertical section through the bearing of the guide rods. Fig. 18 is a transverse section through the port of the 90° valve. Figs. 19, 20, 21 and 22 are details.

A' is the cylinder of a hydraulic press.

A is the ram which moves therein and is actuated under the influence of a pump or accumulator in the well known way. I do not show either pump or accumulator, not considering it necessary.

B is the thrust head of such press and C the hydraulic cylinder supporting end thereof.

D, D, are the strain rods holding these two ends together.

$e, e, e, e, e$, are a series of drainage members forming thereby a series of compartments for the compression chamber.

M, Figs. 4 and 6, is a bar supported in holes $e^4$. The member in which these holes are is the portion of the drainage tray that extends beyond the compression chamber and there is one hole for each tray or each drainage member. The bar M is stationary as to longitudinal motion, but the trays are free to move forward or rearward with the movement of the ram. In these movements the holes $e^4$ permit the bar M to slide through them, without any movement of the said bar.

$e^5$ is a bar holder. There are two of these holders. A link $e^6$ connects these holders with the eccentrics 32 of the shaft 31 which actuates them. The mechanism for actuating this shaft is not shown, being old in my former applications already referred to.

$f^2, f^2$ are chains which are fixed to the part of the tray $e$ which projects beyond the compression chamber, as shown at $e^7$. These chains $f^2$ can be held to said projections in any practical way.

N is the lid or top of the compression chamber and G is the bottom therefor. The mechanism for actuating these two members forms no part of my present invention and I do not, therefore, show it in the drawings.

T is a hopper wider at the base than at the top to permit free passage of the material therefrom into the chamber beneath it.

5 is a shaft carrying a series of feeders or knives 4. I say feeders or knives and desire it understood that sometimes I would use feeders merely, as in wet grains, and in other substances I would use knives entirely, or knives or feeders together; in such substances, for instance, as fish or grapes where the knives would cut the substance in the vertical plane of the drainage trays or partitions and the feeders would feed the material into the said compartments after it is thus cut. Fig. 22 shows this arrangement where the knives are operating directly over the trays and the feeders between the trays, on the same shaft. The shape of the feeders is best shown in Fig. 21, but I do not limit myself to any specific shape, however. It will be seen in Fig. 22 that the knives are shown at 4, chamber partitions at $e$ and feeders at $4''$.

42 is a prime shaft.

$42'$ is a belt which actuates the wheel 6 of the shaft 5. The shaft $5'$ which I would sometimes employ as a supplemental shaft is actuated by the belt $42''$, of the wheel $42'''$, of the shaft 5, shown only in Fig. 5. I, therefore, do not limit myself to the number of shafts 5, with their feeders or knives, that I may employ.

V is a T rail; there are two of these rails shown in the drawings. They are fixed to the spider of the platen, V', Fig. 4, at one end and at the other carried on the roller W. I do not, however, limit myself as to the manner of supporting these platen and ram carriers, V. This construction, it will be noted, enables the platen to move up within the compression chamber and at all positions of the platen keep the lateral walls of the said chamber intact. This is very essential.

V'' is a lever pivoted to the cross bar Y at $h$. It is held by the yoke X to the strain rod D. There are two of these yokes in practice, one for each strain rod and they hold the bar Y tight and rigid against any motion. While it is not absolutely essential that they should be adjustable, yet in practice I consider it good policy to make them so.

Z is a friction roller carried by the said bar Y.

V''' is a chain fixed to the end of the lever V'' at one end and to the end of the lever 3 at the other end. It is carried around the roller Z aforesaid.

The carriage G has a series of roller supports $i, i, i, i$. These carriage supporting rollers are adapted to run on a track for which purpose they carry circumferential grooves fitted to run on suitable tracks J, J.

r is a pin which is also carried by the said carriage arranged in any convenient position and, as shown in the drawings, it is a projection of one of the wheel journals. The said carriage, or bottom of the compression chamber, is moved by the arm 37, through the link 36, which two elements are operated by the shaft S', crank 40, link 38, crank 39 and shaft S'' to which latter shaft the said arm 37 is keyed. I do not show the mechanism for actuating the shaft S' as the same is old in my former applications and reference thereto is not essential here.

L is a dog, carried by the arm 2, the latter fixed to the shaft $l$.

$m$ and $m$ only are bearings for the shaft $l$. They are mounted on a firm foundation of masonry or concrete having grouted bolts to hold them in a fixed and unyielding position.

$m'$ and $m'$ are two cams carried by the shaft $l$ and on these cams the tracks J, J for the carriage wheels rest.

3 is a lever fixed to the shaft $l$.

U'' is a pivotal support for the oscillating portion of the wheel or carriage track U'. This latter is pivoted to the main track J at $r'$. The dotted line $t$ shows the drop of the carriage and this line indicates the position of the carriage after the cams $m'$, $m'$ are turned to permit the bottom G to drop prior to the opening of the chamber by the moving of the bottom by the means already referred to.

$t'''$ is a scraper resting on the bottom of the chamber G and held by the arm $t'$ to the pivotal support $t''$. The radial line $t^4$ shows the limit of drop for the scraper $t'''$ when the bottom G is dropped.

Having now described the construction of the bottom dropping mechanism its operation is as follows: We will assume the chamber formed by the head B of the press, the platen H, the lateral walls $f$, $f$ and the bottom G, has been filled with material for liquid extraction. We will also assume that the ram and platen have been forced up to maximum pressure, the bottom G meanwhile being closed and raised, as shown in the solid drawing, Fig. 5. While the bottom G is closed the lever V'' is in the position shown in the solid drawing in Fig. 4. While in this position the dog $a$ is just high enough that its upper portion is in the horizontal plane of movement of the pins $a'$ and $a''$. Now as the ram moves rearward the pin $a'$ or $a''$ will engage the dog $a$, which dog when so engaged becomes locked to the lever V''. As the pins $a'$ and $a''$ are carried by the T rail V and the T rail V is fixed to the ram and platen, as set out, it follows the said pins will move with the platen. On the pin $a'$ or $a''$ moving rearward by virtue of the pin contact with the dog $a$, as described, the lever V'' will be oscillated and the chain V''' will thus pull the lever 3 up or in the direction of the arrow shown in Fig. 5, and the angular movement of the lever 3 and lever V'', with the dog $a$ which the latter carries, is so timed that by the time the pin $a'$ or $a''$ has cleared the dog $a$ the lever 3 will have been oscillated 90° or to the dotted line $d''$. Now as the lever 3 is fixed to the shaft $l$ and the lever 2 is also fixed to this shaft, and the cams $m'$ $m'$ are likewise so fixed and carried by the same shaft, it follows they will all be rotated 90°. This will drop the rails U' and U, which carries the carriage supporting rollers to the dotted line $t$ and line $t^7$ and free it absolutely from any impacted residuum within the compression chamber. After the lever arm 37, link 36 and connections have opened the chamber by moving the said lever 37 from the radial line $f^5$ to $f^6$ a return motion of the arm 37 from $f^6$ to $f^5$ raises the bottom G back to its normal position, as shown in Fig. 5. This is accomplished in the following manner: $r$ is a pin carried by the bottom carriage G. Now as the dog L occupies the position shown by the radial line $d'''$ when the bottom is down and chamber, therefore, open; and as the said dog L is in the horizontal plane of the moving pin $r$, it follows that as the carriage is closed the said pin $r$ will engage the said dog L and swing it back to the position shown by the solid drawing, Fig. 5; and, as the cams $m'$, $m'$ are rigid with the shaft $l$ as well as the levers 2 and 3, the said cam will raise the bottom G by oscillating the said shaft $l$ and the cams $m'$ $m'$ mounted thereon. During this movement the lever 3 through the chain V'''' will swing the lever V'' and its dog $a$ to the position shown in the solid drawing, Fig. 4, from the position shown in the dotted lines, same figure. Now as the rail V is moved up by the ram the pins $a'$ or $a''$ will swing the dog $a$ on its pivot $b$ in the circle $e^{10}$ until the end of the pin slips off of the said dog and it is thus ready for another operation. I show two pins on the T rail V. The object in so doing is to anticipate various degrees of initial solidity of the material in the compression chamber. These different degrees of solidity or density of material would determine a greater or less movement of the ram, platen bar V with its pins $a'$ and $a''$, as is evident.

I will now describe the means I employ to return the ram and platen hydraulically.

9, 9, Figs. 1 and 2, Sheet one, are two hydraulic cylinders. They are connected by liquid conductors 10 and 10'' with the pump or accumulator (not shown) through the valve 16. It will be noted that the view, Fig. 1, is a side elevation and Fig. 2 is a plan, but that I show in these two views two specific pipe arrangements. Of course the arrangements of the pipes is a matter that is not of moment so far as the invention is concerned as they could be arranged in any manner that will permit the liquid used in compression to flow through the valve 16 to return the ram A rearward, and through the valve 19 from the pump (not shown) to the ram A, and thus move the platen H. The disposition of these cylinders is not material to my invention, nor is their number. It is sufficient that hydraulic cylinders and a contained ram are employed to return the platen after its compressive function is accomplished. The two cylinders, which I will term supplemental cylinders, are constructed in the same manner and a description of the structural features of the one will answer for the two.

7 is a strain rod carried by the piston or plunger 7'. At its platen end this rod has a hook or link ring $7^2$, linked to hook 8 of the platen. The pipes $10^2$ and $10^3$ are joined to the pipe 10", thus conducting the liquid from pipe 10 to the platen end of the cylinder 9 and between the cap of the said cylinder 9" and the inner face of the piston or plunger 7'. It is thus evident that when the valve 16 is in position to permit the water to flow through the pipe 10, the tension rods 7, will pull on the platen H and move it rearward. It is necessary that I arrest this rearward movement at a predetermined time, and this time is physically predetermined by the expanding limit of the trays forming the compression chamber divisions for the compartments therein. The pins $a'$ or $a''$ should be so positioned on the rail V that soon after the platen has had its full forward movement they will engage the dog A and swing the lever V", dropping bottom, this will relieve the partitions e, e, e, e, of strain in pulling the residuum on the bottom G of the said chamber. The opening of the bottom of the said chamber is accomplished immediately on the arresting of the rearward movement of the platen and ram. As hereinbefore stated I do not illustrate this bottom actuating mechanism in this application as it is fully set out in my co-pending cases.

11' is a cam carried by the platen.

12 is a safety valve and an exhaust port as well.

11 is a lever, properly weighted in the manner of safety valves. After the ram A and platen H are forced back to almost their limit, the cam 11' of the platen H strikes the lever 11 of the safety valve and raises it, thus permitting the liquid used in the pump or accumulator which, during the return of the ram A and platen H was exerting its force on the inner face of the plunger or piston 7', to pass through the safety valve 12, which now becomes an exhaust port, and permitting the liquid to flow through the pipe 10' back to the reservoir 13, shown only in Fig. 1. In Fig. 3 the plunger 12' operating on the weighted lever 11 explains the manner of exhausting through the conductor 10".

*Pressure sustainer.*—Figs. 7 to 17 illustrate the new features of my pressure sustainer as it co-acts with the cylinder of the press. 50', 50' are the two standards of the machine. 50" a top cross bar therefor. 50 is a sleeve carried on shaft 51. The sleeve has thus become the bearing for the shaft and the said sleeve is journaled in bearings 51' and 51' of the top 50". 52 is a worm wheel and 52' is a worm carried by the sleeve 50. 53 is a belt wheel carried by the shaft 51, 59 is a belt wheel and 58 a belt Fig. 8. This belt is carried by the two said wheels and actuates the latter as the follower of the former. 50''' is the driving wheel for the mechanism. It is carried by the shaft 51. 60 is a crank carried by the shaft 60' of the wheel 59. The shafts 51 and 60' are continuously rotating as well as the crank 60. 61 is an oscillating lever pivoted to the standard of the machine at $60^2$. The dotted line 60", Fig. 7, shows the limit of the oscillation of this lever. 67 is a belt shifter shaft carrying a belt shifter 68. 68' is a sliding member best shown in Figs. 11 and 17. It carries a pin 68" and into this pin is fitted the slotted end of the arm 61. 72 and 74 are two guide arms rigid with the element 68' and also with their end retainer 73. It will now be seen that the parts 68', 73, 72 and 74 constitute a rigid frame and the arm 61 being in continual oscillation keeps the said frame in continual rectilinear reciprocation. The belt shifter rod 67 is normally disengaged from this reciprocating frame, but the said frame is guided on the said rod and the rod is supported by its housings, the two standards, 50', 50'. 86 is a rod, Fig. 11, also housed in the two said standards. 85' is a hand engageable lever fitted to the rod 86 in such a way that the lever can oscillate but not the rod. 82 is a connecting element between the rod 86 and the belt shifting rod proper 67. The normal position of the lever 85' when the pressure of the machine is not up to maximum is shown by the solid drawing, Fig. 11. 83 is a locking lever. This lever is free to oscillate on the rod 67. 84, Figs. 7 and 11, is an offset on the frame 84' and against this offset the lever 83 rests while the pressure is going up and the pump is in action through the belt on the fast pulley thereof. 69 is a weight and 70 a chain running around the roller 70" and through the lug 70''' connecting the belt shifter arm 67 with the said weight. Now as the pressure operates the plunger 90 of the safety valve 89 the arm 76 finally at maximum pressure is oscillated by the plunger 90 pressing on the under side of the said arm. It is hardly necessary to note that the force producing this pressure is the liquid pressing on the plunger 90 in the small chamber 110' of the small accumulator 89, Fig. 16. The parts are so adjusted that when the arm 76 is oscillated to its limit, as predetermined by the adjusting screw 78 (77 being the lower limit), the lever 83 will be raised and detached from its contact with the offset 84 of the frame 84', the weight 69 will thereupon pull the belt shifter 68 from the dotted line marked "fast" in Fig. 11 to that marked "loose" in the same figure. It is evident that the rods 67 and 86 will meanwhile have moved the same distance. As the lever 76 is raised it also contacts with the lever 75 and raises it. While the pressure is up to maximum this latter lever is held out of the path of the moving frame formed by the parts 73, 68', 74 and 72. Now as the said frame, through the lever 61, is in continual reciprocation at the rate in normal practice of about 24 times per minute, it follows that the moment the pressure relaxes to a sufficient degree the bar 76 of the accumulator 89 comes under the influence of the weight W'', Fig. 7, and the moment the said weight pulls down this bar or lever 76 the brace 73 of the reciprocating frame aforementioned engages the said lever 76, as shown in Fig. 17 (section) and forces it and the belt shifter through the rod 86, connection 82 and rod 67 from the position marked "loose" in Fig. 11 to that marked "fast" in the same figure. Fast meaning that the belt is on the fast pulley of the pump and loose on the loose pulley thereof.

In practice it is found that the lever 76 carrying the weight W'' is not as responsive to a fall in pressure as good work would desire or indeed require. It, therefore, becomes necessary to sensitize the action of the pressure regulator so as to make it responsive to a very moderate drop in pressure. To be more specific: If I am using a working pressure of 3,000 pounds per square inch in the chamber A' and at this pressure, we will assume, that the weight W'' will be lifted, when lifted this weight will not reseat the plug or plunger 90 until the pressure in the cylinder drops to about 2,200 pounds per square inch in the said cylinder A'. To have a highly effective machine, therefore, it becomes necessary for me to provide some auxiliary means which will bring this bar 76 down to permit the lever 75—85' to be engaged by the actuating frame therefor, which frame has been fully described. It is important nevertheless that while this frame needs this assistance in bringing it down it must be absolutely free to go up to its limit through the pressure of the liquid on the plunger 90.

These results I successfully accomplish as follows: 62 is a bar carried by the crank 60 of the rod 60' at one end and at the other it carries a slot 66 wherethrough passes a pin 65, which latter is fixed to the weight carrying lever 76. 63 is a spring fixed to the pin 65 at one end and to the lower end of the bar 62 at the other. 63' is a threaded end of the spring 63 and passes through the angularly extended portion of the frame 62, 63''. The nut 64 permits of increasing or decreasing the tension on the spring 63. This spring is so adjusted that when the crank 60 is in a vertical position and the slot 66 has passed up over the pin 65 to its limit, the spring is practically out of tension, therefore, the pressure on the plug 90 is free to exert its unrestricted force against the under side of the lever 76, but when the said crank in its orbit has traversed 180° the spring 63 is in sufficient tension to pull down the bar 76 on a very moderate decline in pressure in the cylinder A', or accumulator 89. By a very moderate decline I mean that if I am working at a pressure of 3000 in the cylinder, with a properly adjusted spring, if the pressure falls to 2925 pounds the spring 63 will pull the lever 76 down sufficiently so that the frame aforesaid will be engaged by the lever 75 and thus force the belt from the loose to the fast pulley of the pump. This gives me a perfect pressure controller, and a perfect pressure controller is an absolutely essential sub-mechanism to an automatic hydraulic press. It is very evident that instead of shifting the belt from the fast to the loose pulley of the pump by the mechanism just described, I could, as the full equivalent therefore, connect the rod 67 with a valve leading to an accumulator, such as are usually employed in the initial stages of hydraulic work, especially when the presses are arranged in series. I might also employ electrical means and have a circuit that could be opened on the rise of pressure and closed on the fall thereof. This circuit could control the valve leading to the accumulator or the belt shifter of a pump. These specific features of structure are not material to my invention. I desire them to be considered as equivalents broadly. They are a few of the many possible applications of the principles involved in my application of means for the controlling of pressure as a sub-combination in a hydraulic press. I do not illustrate these modifications, nor do I deem it essential so to do here, but later I may file specific applications therefor. 50''' is a belt wheel, being the prime wheel of the machine. It is carried on and actuates the shaft 51. $50^3$ is a clutch $50^2$ a clutch pin, Fig. 7, adapted to engage in holes in the adjacent face of the clutch. These holes are indicated at $h''$. The pin $50^2$ should be yielding for which purpose a spring $h''''$ provides energy. The form of clutch is however not material, and any of the well known clutch structures for this clutch $50^3$ would answer.

The operation of the clutch $50^3$ is as follows: The lever 81 is locked to the member 82. It will be remembered that the said member 82 holds the shaft 86 with the shaft 67. This locking is accomplished by the end of the said lever being held between the two upward extending lugs $n''$, $n''$ of the said member 82. Now as the rod 67 moves the belt from the fast to the loose pulley the said lever 81 oscillates to the position indicated by the dotted line $S'''$ in Fig. 7. The clutch $50^3$ then becomes engaged with the wheel $50'''$ and when so engaged the sleeve 51 rotates with the shaft 50 and, as the said sleeve carries the worm $52'$, and the worm $52'$ actuates the worm wheel 52 and therethrough the time recorder for high pressure sustaining, it follows that this time pressure predeterminer only operates when the pressure is at maximum, and the exhaust valve 19 is closed, for when this valve is not closed the clutches 54 and 56 are disengaged and the shaft 57, Fig. 8 only, does not actuate shaft $57'$, which moves the pinion and rack of the indicator moving mechanism for time sustaining through the pinion $57'''$ and rack $57''''$ the former fixed to the rod $57'$ and the latter to the frame composed of rods $57^2$, $57^3$ and the ends $57^4$ and $57^5$. The rod $57^2$ carries the finger adjustable pointer $57^6$ and the adjusting screw $57^7$. This time predetermining mechanism is substantially the same as that set out in my applications hereinbefore referred to and an extended description is, therefore, not considered necessary hereabout what I have already said in addition to which I would note: The frame above referred to is carried in housings $b''$ and $b'''$, Fig. 8, and these housings permit the rods $57'$ and $57^3$ of the said frame to slide freely therein as guides. A weight $b'''''$ on a chain $b''''$, which chain is fixed to the rack 57, pulls the carriage back to normal after the valve 19 is opened and the pressure thus released from the cylinder $A'$.

$y^3$ is a valve lock trip carrying an adjusting screw 577. This screw contacts with the arm $y^7$ of the bell crank valve lock. A thumb set screw $Y'$ holds the member $y^3$ to the rod 572, and at whatever position thereon it is desirous of having it, as required for different time periods for time sustaining.

$y''$ is a lever pivoted to the standard and, in the position shown in Fig. 8, it permits the clutch members 56 and 54 to be engaged and while so engaged the worm wheel 52 will, through the shaft 57, actuate the shaft $57'$, which carries the pinion $57'''$ by which the rack $57''''$ is actuated. Now as the rack $57''''$ moves the frame on which the trip $y^3$ is carried and as the valve 19 is controlled by the part $19'$, rigid with the stem of the said valve, and the projection $y^4$ is in the path of the end trip, it follows that when the arm $y$ is oscillated to the position indicated by the dotted line $19''$, the member $19'$ will be free to oscillate and the valve free to be opened. Should the weight $C''$, through the chain $C^2$, which chain is linked to the member $19'$ at $y^2$ and held in a circumferential groove, as shown in Figs. 8, 10 and 11, fail to open the said valve 19, the lug $y^3$ will contact with the lug $y^4$ and thus start the said valve from its seat after which it will swing 90°, or from $y$ to $y'$ against a stop $y^8$. During this movement the lug $y'''$ will contact with the arm $y''$ and swing it to the dotted line $OO''$ and thus unlock the clutch jaws 54 and 56 through the rod $y''''$—55. Immediately on the aforesaid clutch becoming so unlocked the weight $b'''''$ is free to exert its energy in restoring the frame which carries the trip $y^3$ to its initial or normal position, thus reseating the time recorder finger $Y''$. It is hardly necessary to state that the numerals on the plate on Fig. 8 represent time units of one minute and when I set the finger $Y''$ pointing at 5, as it is shown in Fig. 8, that means that it will take 5 minutes for the said finger to move a distance sufficient for the adjusting screw $57^7$ to contact with the arm $y^7$ of the bell crank and oscillate it sufficiently to have the arm $y^6$ of the said bell crank disengage the lug $y^4$ of the valve holder $19'$, after which the valve is opened, as described. $C^3$ is a turn roller for the cord $C^2$.

80, Fig. 7, is an adjusting means for the arm 75, this arm having a handle $85'$. After the member 73 of the belt shifting frame has locked the arm 83 in engagement with the offset 84 it has a slight additional movement and during this movement and in consequence of it the lever 75 rides up on the angularly positioned lever 80 and remains there until the lever 76, by the pressure as already described, is raised and disengaged thereby from the locking arm or offset 84 of the frame $84'$. The radial line in Fig. 12 shows the range of movement of this lever 75, $85^2$ showing the lower position and $85^3$ the upper limit of motion. In the lower position it is in the path of the moving frame 72—73—74 and in the upper the frame is free to move under it. This latter position is the position it occupies when the belt is on the fast pulley of the pump as in this position the said lever 75—$85'$ is supported on the incline 80.

It is very necessary that the lever 76 should be operated by a very slight movement of the plug 90. To do this I multiply the angular movement, as shown best in Figs. 12 and 7, in which 88''' is a lever pivoted to the frame as shown at z', 88' is an adjusting screw pivoted to the frame 76 and 87 is an adjusting nut carried by the screw 85. It will be seen the screw 88' engages the lever 83 near its pivotal point on the rod 67. A slight movement, therefore, of the bar 76 is materially multiplied at the point where the lever 83 contacts with the lever 76. This makes the arrangement exceedingly sensitive.

While I have described the ram and the platen and how they are returned automatically by hydraulic means and that I employ what I term a 90° valve in this function in connection with a regular exhaust valve, I have not as yet described the construction or arrangement of these valves. These valves are shown in Fig. 15 and their connections in Figs. 7 and 8.

The valve 19 is the exhaust valve and it has novel features which I will now describe. The outer casing is threaded internally. 100 is an integral portion of the valve, whose seat is shown at 107', Fig. 15. 107'' is a packing for the valve. This packing is inset in the base 102. A movement of 90° on the part of the stem 100 through the member 19' it carries rigidly, separates the plug seat 107' from the packing 107''. The distance of this separation is indicated by the lines l and l''. This unseats the exhaust valve and the water is free to pass from the cylinder A' back into the reservoir from which the pump takes its supply 13. 104 and 106 are packing plugs for the valve 19. 103 is the ring which incases the said valve acting as a holder, therefore, it can be a part of the frame 103'. In the vertical sectional view shown in Fig. 15, it will be seen, the plug 102' is also threaded into the body of the valve 19. I thus get adjustment for the said valve seat without changing the throw of the member 19', and at the same time I need not disarrange or disconnect the exhaust 14. I show this exhaust conductor in Fig. 1 as entering the liquid supply tank in which view it appears behind the pipe 15. The pipe 23 leading from the pipe 15 which is the conductor between valves 16 and 19, through the pipe 111 connects the pressure cylinder, pump and valves with the small accumulator 89. This element 89 is not strictly an accumulator, but I will so term it in want of a more appropriate name. It is made as a safety valve save that it possesses no overflow outlet. In Fig. 16 this is best explained where 112 is a cap, 90 is the plug or movable piston which receives the pressure and 110' is a chamber into which the inner end of the said plug or piston passes. 113 is a packing chamber into which the hydraulic packing 114 is accommodated. The valve just described is the exhaust valve and it controls the action of the 90° valve which I employ to change the force of the pump's action so that the pressure forces the ram A and the platen rearward instead of forward. The valve 16 has two end packing plugs 115 and 109, a tapered core plug 118, having an integral stem 116, which carries rigidly a crank 17. This crank controls the valve through the slotted lever 18 as will be described more at length in describing the operation of the machine. 100'' is a pipe or conductor leading directly from the pump or accumulator, as the case may be. This conductor leads through the packing of plug 115 of the 90° valve. 117 is a hole in the tapered plug and 119 a vent hole therein. On either end of the tapered plug is a small liquid chamber 120 and 121 respectively. Figs. 13, 14, 15 and 18 illustrate this valve and conductor connections. S'', Fig. 15, is a hole passing to the center of the tapered core 118 transversely; it intersects the longitudinal hole 117 in the same plug. This gives a free passage of the liquid from the pipe 100'' to the chamber 120 and when the net areas of the end surfaces of the plug 118 are equal, as they should be, the said valve plug will be hydraulically balanced at all pressures. The chambers 120 and 121 are at all times in direct communication with the pump or accumulator. Now when the hole S'' is in the horizontal position it communicates with the conductor leading to the hydraulic chambers 9, 9, Figs. 1, 2, 7, 13 and 14. This occurs only after the exhaust valve 19 is open and the liquid is free to pass from cylinder A', as will be more particularly described when speaking of the operation of the machine. Now when the taper plug is turned 90°, so that the hole S'' is in the vertical position, the liquid is free to pass through the valve 19 to conductor 23 which leads into the cylinder A' and when this is the position of the parts and ports the pipe 10 is cut off from the pump. It is thus seen that it is not possible for the pump to act on but one cylinder at a time, and the moment the ram A is up to its maximum the valve 16 changes the course of the liquid to return the said ram by forcing the said liquid out of the said cylinder A' through the exhaust valve 19, pipe 14 into tank 13 for supply. The moment the exhaust valve is closed the pressure is exerted through pipe 23, valve 19 into cylinder A', forcing the liquid from the hydraulic chambers 9, 9 through the exhaust valve 12, out of pipe 10'' back to supply tank 13, Figs. 1, 2 and 3.

*Operation.*—Having now described the structure of my machine its operation is as follows: After the material has passed into the compartments of the compression chamber formed by the drainage members e, e, e, e, e, and the lid N of this chamber is closed by the chain N' pulling on the member 19' of the exhaust valve, the liquid is free to pass to the cylinder A' as already described and act compressively on the ram A and thus operate the platen H. It is well to remark at this time that I do not deem it necessary to show the mechanism for pulling on this chain N', because the same is old in my former and co-pending applications, but suffice it to say that this mechanism is operated just as the lid is being closed, and preferably at the time it is absolutely closed. Any moving element of the machine could be employed to operate it. After the exhaust valve is closed and the ram has been moved up to maximum pressure as predetermined by the setting of the weight W'', the lever 76 will be raised. The link 85, through the adjustable screw 87 will thus raise the lever 88''' and the screw 88' Fig. 12 carried thereby. The raising of this lever 76 will disengage the belt locking lever 83 from its engagement with the offset 84 of the frame 84', Figs. 8, 7 and 11. The weight 69 will then pull the belt shifter 68 through the cord 70 unto the loose pulley of the pump, meanwhile the lever 81 operated by the member 82 will shift to the position indicated by the dotted line S''', Fig. 7 only. The clutch $50^3$ carried by the sleeve 50 will thus become locked to the wheel 50''' in the manner set out. The worm 52' will actuate the worm wheel 52 and therethrough the shaft 57 and shaft 57', rack 57'''' and trip $y^3$. If there is no leakage in the connections this operation of these elements will continue until the end of the screw $57^7$ contacts with the arm $y^7$ of the bell crank lock and until the arm $y^6$ of this lock is oscillated to the position indicated by the dotted radial line, meanwhile the trip $y^3$ has moved up to and is in contact with lug $y^4$ of the valve actuating member 19', whereupon the valve is unseated and opened. The operation of the valve as described contemplates no leakage and a pressure sustaining of 5 minutes.

We will now assume, however, that there is considerable leakage in the joints and connections. Under this condition the lever 76 under the intermittent tension of the spring 63 would be pulled down until the locking lever 75—85', Figs. 7, 11 and 12 engages the perpetually reciprocating frame 72—73—74—68', whereupon the said lever 75 will force the rod 86, connection 82, rod 67, belt shifter 68 and locking lever 83 to the position shown in the solid drawing, Fig. 11, the lever 83 will then engage offset 84 of the frame 84', locking all the parts named until the pump has again forced the pressure up to the predetermined maximum. 18''' is a slot in the link 18 and 18 connects the member 19' of the valve 19 with the crank with 17 of the valve 16. The radius of the crank 17, it will be seen, is smaller than the radial contact of the arm 18 with the member 19' of the valve 19. The momentum, therefore, given the member 19' by the weight C'' will give the crank 17, and the 90° valve which it operates, and with which it is rigidly connected a severe wrench, pull or blow and it becomes instantly opened or turned 90°. The effect of this turning will instantly throw the pressure through the liquid into the cylinders 9, 9 and exhaust the same from the cylinder A', through pipe 23, valve 19 and pipe 14 into reservoir for supply 13. After the valve for exhausting is opened the bottom of the compression chamber is opened, following the dropping of the said chamber bottom, the compartment walls cleaned, the chamber filled and the operations here described all repeated. I do not show the mechanism for actuating the bottom, the cleaning mechanism, nor do I make any claims therefore in this application as they are old in my co-pending cases.

I do not limit myself to the specific structural features set out in any particular, but could make numerous modifications without departing from the spirit of my invention. I could for instance use an electrical current to operate the belt shifter the opening and closing of the circuit of which is controlled by the belt shifter releasing lever, that is the lever actuated by the pressure on the small accumulator 90. I could use a solenoid, or other electrical means to actuate the said belt shifter. I could also use an electrical current to operate the mechanism for the dropping of the bottom of the compression chamber, the opening and closing of which circuit could be controlled by the platen at a predetermined point in its position, or some other moving element in the machine. I could also use an electrical means to operate the valves having the contacts for the opening and closing of the circuits controlled by some moving part of the machine at the proper time. These are mere equivalents of my broad claims.

Having now described my invention what I claim as new and desire to secure by Letters Patent is.

1. In a press having a compression chamber, a platen moving therein compressively, means to actuate the platen in combination with mechanism to expand the chamber transversely.

2. In a hydraulic press having a compression chamber, a platen working therein compressively, automatic means to control the action of the platen, means to expand the said chamber transversely and at a predetermined point in the cycle of the machine.

3. In a press having a compression chamber, a pressure producing element moving therein reciprocally, means to expand the said chamber by moving one of the walls independent of the expansion caused by the said pressure producing wall, the said latter means controlled by a moving element of the machine.

4. In an automatic press having a compression chamber formed by walls with means for producing compressive action in the said chamber and means for moving expansively one of the said walls independent of the means which produces the pressure.

5. In an automatic press having a compression chamber formed by walls normally fixed, a movable platen forming one of the said walls, means for moving the said platen compressively, means for expanding the said chamber by the moving of one of the normally fixed walls independent of the compressive motion of the platen, but controlled by a moving part of the machine.

6. In an automatic press having a compression chamber, a movable top for the said chamber whereby on the moving of which the said chamber is filled, a bottom for the said chamber whereby on the moving of which the said chamber is emptied after pressure, means for dropping the said bottom thus relieving the said bottom of the pressure from the residuum in the chamber, as set out.

7. In an automatic press having a compression chamber, a movable top for the said chamber, whereby on the moving of which the chamber is filled, a bottom for the said chamber, on the moving of which the chamber is emptied of its contained residuum after pressure, means for dropping the said bottom and means for moving the said bottom away from the zone of the compression chamber after being so dropped.

8. In an automatic press having a compression chamber, a movable top for the said chamber, on the moving of which the chamber is filled, a bottom for the said chamber on the moving of which the said chamber is emptied, means for dropping the said bottom, means for moving the said bottom away from the zone of the compression chamber after being so dropped and means for returning the said bottom back to its normal position.

9. In an automatic press having a compression chamber, means for producing pressure in the said chamber, a movable top for the said chamber, a movable bottom for the said chamber, a track on which the said bottom is supported, means for dropping the said track and means for raising the said track.

10. In an automatic press having a compression chamber, means for producing pressure in the said chamber, a movable top for said chamber, a movable bottom for the said chamber, a series of rollers carried by the said bottom, a track on which the said rollers are supported and run, and means for dropping track and rollers as set out.

11. In an automatic press having a compression chamber inclosed or formed by walls, a movable top for the said chamber, a bottom for the said chamber, a support for the bottom, means for dropping the bottom and its support and means for cleaning the bottom.

12. In an automatic press having a compression chamber, with an entrance thereto, an exit for residuum discharge therefrom consisting of a plate or wall, means for moving this plate or wall whereby the chamber is expanded and means for moving the said plate from the zone of the chamber thus permitting of residuum discharge.

13. In an automatic press having a compression chamber, a series of partitions in the said chamber forming thereby a series of compartments in the said chamber, a movable lid for the said chamber on the moving of which the said chamber is filled, a hopper for the said chamber located above it, a series of knives in the said hopper mounted on shafts or rods, and a series of packers carried by the said shafts.

14. In an automatic press having a compression chamber, a movable top for the said chamber, a series of partitions in the said chamber forming thereby a series of compartments a hopper located above the said chamber wherein the material for pressure is held prior to entrance to the chamber and a series of feeders or material agitators, a series of knives co-acting with the feeders located in the said hopper.

15. In an automatic press having a compression chamber with series of compartments therein forming thereby a series of compartments, a hopper located above the said chamber, a movable top interposed between the hopper and the chamber, a series of knives or cutters operating in the said hopper one knife over each partition in the compression chamber, whereby the material is cut and separated and thus divided and thereafter passed into the compression chamber.

16. In an automatic press having a compression chamber with a series of partitions in the said chamber forming thereby a series of compartments, said partitions having a portion of their frames projecting beyond the walls of the chamber, a common bar uniting the said partitions so as to permit their operation as a unit in a transverse reciprocal motion, while at the same time the said partitions can move forward and rearward on the bar, said bar located without the compression chamber.

17. In an automatic press having a compression chamber and a series of partitions in the said chamber forming thereby a series of compartments, means for uniting the said partitions exterior to the walls of the said chamber by chain, cord or flexible element and a common agitating means connected with all of the said compartments also without the chamber, as set out.

18. In an automatic press having a chamber with walls $f$, partitions $e$, $e$ said partitions having projecting members with holes $e^4$, bar M without the chamber and chains $f^2$, $f^2$.

19. A sub combination to a hydraulic press and in combination with the cylinder of the press of a valve controlling the exhaust from the said cylinder, a conductor from the said cylinder to this valve, a valve to control the return of the ram carried by the aforesaid cylinder, a conductor from the pump to this valve and automatic means to operate the said valves at predetermined points in the cycle of the machine.

20. In an automatic press having a compression chamber and hydraulic means for producing compressive action in the said chamber, a pump having a fast and loose pulley, a pressure regulating device consisting of a belt shifter, means for actuating the said belt shifter controlled by the pressure automatically compressing lever 76, controlled by the piston 90, shifter 68, rod 67 and spring 63.

21. In an automatic hydraulic press having a compression chamber, a ram working therein, a pump having a fast and loose pulley, a pressure regulating device consisting of a belt shifter, means for automatically actuating the belt shifter on the rise of pressure to maximum from the fast to the loose pulley of the pump compressing lever 76, hydraulically controlled, shifter 68, rod 67 and means for reciprocating said rod and means to actuate the belt shifter automatically from the loose to the fast pulley of the pump on the fall of pressure.

22. A sub combination to a hydraulic press and in combination with the cylinder of the press and the ram carried thereby of an exhaust valve controlling the exhaust from the said cylinder after maximum pressure, means for automatically operating the said valve whereby the return of the ram is permitted as the liquid used in compressive action is exhausted, and a supplemental valve automatically controlled and regulated whereby the return of the said ram is accomplished hydraulically.

23. In an automatic hydraulic liquid extracting press having a compression chamber with automatic mechanism for operating the inlet and the outlet to the said chamber and a ram and cylinder to contain the ram and a pump in combination with a valve automatically controlled for regulating the action of the ram during its compressive action and exhausting the liquid employed in compression after a fixed maximum pressure and a supplemental valve automatically controlled permitting the liquid employed to return the said ram to its normal position after maximum pressure.

24. In an automatic press having a compression chamber and an automatic mechanism for producing compressive action therein, and automatic mechanism to open and close the inlet and outlet alternately to the said chamber, in combination with a valve automatically controlled to regulate the pressure and exhaust during pressure in the chamber, and a valve automatically controlled to regulate pressure to return the ram to its normal position after maximum pressure, as set out.

25. A sub combination to an automatic hydraulic press in combination with the pump and the cylinder of the press and its contained ram and liquid conductor between the said pump and cylinder of accumulator 89, lever 76, trip arm 83 and connections between the said trip arm and the said lever.

26. As a sub combination to a hydraulic press having a cylinder, pump and a fast and loose pulley on the pump, a pressure predetermining device, a time recorder for maximum pressure sustaining, automatic means for operating the time recorder, mechanism and a mechanical connection between the maximum pressure device and the time recorder comprising a rotating element, a clutch included in said mechanism and means controlled by the pressure at maximum as predetermined for locking the said clutch to said rotating element, whereby when the maximum pressure is reached, as predetermined, the said time recorder mechanism is actuated.

27. A pressure sustaining device as a sub-combination to an automatic hydraulic press having an accumulator chamber, a piston working therein, a lever controlled by the said piston through the action of the liquid pressure thereon after reaching a certain predetermined pressure and means for arresting the return action of the said lever after the pressure on the said piston falls below a predetermined maximum.

28. A pressure sustaining device as a sub combination to an automatic hydraulic press having an accumulator, a pump, a liquid conductor between the pump and the cylinder of the press, means controlled by the pressure through the accumulator whereby the action of the pump is controlled comprising a lever 76, actuated by the pressure, a belt shifter and a lock for the belt shifter and means for actuating the belt shifter.

29. A pressure sustaining device as a sub combination to an automatic hydraulic press having an automatic device controlled by the pressure, whereby the action of the pump is controlled and comprising a lever 76 actuated by the pressure, a belt shifter, means for actuating the belt shifter and a lock between the said lever and said belt shifter, whereby when the pressure reaches maximum the said lever is operated, thus operating the lock and permitting the movement of the belt shifter.

30. A governor as a sub combination to an automatic hydraulic press and coacting with the pump and the cylinder of the press whereby the pressure produced by the pump acts on the governor and therethrough on the pump and the pressure in the cylinder.

31. An automatic hydraulic press having a chamber for holding the material for pressure, means for producing pressure in the said chamber, a bottom for the said chamber and means for automatically dropping the said bottom.

32. An automatic hydraulic press having a chamber for holding the material for pressure, said chamber formed by lateral walls, a stationary head and a movable top and bottom in combination with automatic means to move the top and the bottom from the zone of the chamber and means for throwing the bottom out of its normal reciprocating plane.

33. In an automatic hydraulic press having a pressing chamber wherein material for pressure is retained during pressure, a platen working therein carried by a ram and a cylinder in which the ram moves and is supported in combination with a pump an exhaust valve interposed between the said pump and the said cylinder, means for retaining the said valve closed during the compressive action of the pump, a secondary valve, automatic means for automatically opening the said latter valve as the former is closed and a secondary hydraulic chamber, a piston working therein and means connecting the said piston with the ram operatively, whereby the said platen and ram are returned to their normal positions hydraulically.

34. In an automatic hydraulic press having a pump and ram working in a cylinder with a fast and loose pulley on the pump, a continuous moving part, a belt shifter, means for locking said part to the belt shifter on the fall of pressure below a fixed maximum, as set out.

35. In an automatic hydraulic press having a pump, cylinder and ram, a belt shifter, a continuous moving part, means for locking the belt shifter to the said moving part on the fall of pressure below a predetermined maximum and means for unlocking the said belt shifter from said moving part on the return of the pressure to its normal predetermined maximum.

36. In an automatic hydraulic press having a pump, cylinder and ram in combination with a safety accumulator device comprising a lever 76, a belt shifter, means for actuating the belt shifter and a lock, whereby when the pressure reaches maximum the said pressure raises the lever and the lock holds the belt shifter until the pressure falls and the lever likewise falls, thus unlocking the lock; whereby the belt shifter is controlled by the action of the said accumulator, as set out.

37. In an automatic press having a compression chamber and a hydraulic cylinder, means for producing compressive action in the said chamber and cylinder hydraulically, means for throwing into action automatically the said pressure producing means on the fall of pressure comprising an accumulator, an element controlled by the accumulator, a lock and a shifting means, whereby as the accumulator is raised the shifter is thrown in action and the lock holds it until the accumulator falls by fall of pressure.

38. A pressure sustaining device as a sub-combination to an automatic hydraulic press having an accumulator chamber, a piston working therein, a weight controlled pressure indicating device operated by the said piston at maximum pressure and auxiliary means to act on said device contrary to the action of the said piston, whereby the mechanism is sensitized.

39. In an automatic hydraulic press having a cylinder, ram and platen with a pressing chamber in which the said platen moves, an exhaust valve, automatic means for operating the said valve and hydraulic means automatically operated for returning the said hydraulic ram in the cylinder, controlled by a moving part of the machine operated after the said exhaust valve has been opened.

40. In an automatic hydraulic press having a cylinder, ram and platen with a pressing chamber in which the said platen moves, an exhaust valve, automatic means for operating the said valve, automatic means for controlling the hydraulic return of the ram in the said cylinder, said means thrown into operation by a moving part of the machine at a predetermined point in its cycle.

41. In an automatic hydraulic press having a cylinder, ram working therein, a pump, an exhaust valve leading from the said cylinder, a secondary hydraulic cylinder, a piston therein, a mechanical connection between the said piston and the said ram, automatic means for opening the said valve automatically, a conductor from the said valve to the said secondary cylinder, whereby as the said valve is opened the liquid used in operating the ram compressively is thrown into the secondary cylinder and exhausts after forcing back the ram to normal.

42. In an automatic press having a compression chamber, platen working therein, ram, cylinder and pump, a conductor from the pump to the said cylinder, an exhaust valve leading from the said cylinder, means for automatically operating the said valve, a supplemental hydraulic cylinder, said latter cylinder carrying a ram which operates the ram in the primary cylinder after the predetermined limit of pressure has been reached in the compression chamber and an exhaust valve leading from the said latter cylinder, as set out.

43. In an automatic hydraulic press having a compression chamber, a platen moving therein, means for supporting the said platen in a horizontal motion consisting of movable track or supports said tracks moving with the platen and within the zone of the compression chamber.

44. In an automatic press having a compression chamber, with lateral walls and a movable top and bottom, means for producing compressive action in the said chamber and movable tracks on which the said platen is supported.

45. In an automatic press having a compression chamber, a platen moving therein carried by a ram and a cylinder in which said ram moves and in which it receives its pressing impulse in combination with track supports for said ram and platen and means for supporting the said tracks.

46. In an automatic press having a compression chamber, a platen moving therein, a supporting ram therefor, tracks moving with the said ram and means for adjusting said tracks.

47. In an automatic hydraulic press having a compression chamber, a platen moving therein, a ram, a hydraulic cylinder, means for actuating the said ram hydraulically during its pressing moments, a movable track supporting the said ram and platen and means for hydraulically returning the said ram and platen to their normal position.

48. In an automatic press having a compression chamber, an inlet and an outlet to and from the said chamber respectively, a compression plunger working in the said chamber, means for supporting the said plunger in a horizontal working position and means for adjusting the said support.

49. In an automatic press comprising a hydraulic cylinder, ram and platen in combination with a pressure sustainer, consisting of a pump having a fast and loose pulley, a belt shifter, mechanism for automatically operating the said belt shifter, said mechanism being in continuous operation, a lock connecting the said belt shifter with the said mechanism said lock controlled by the pressure.

50. A pressure sustaining device as a subcombination to a hydraulic press and in combination with the cylinder of the press, a pump, a conductor between the said pump and the said cylinder, means for actuating the belt from the fast to the loose pulley of the pump consisting of a continually moving part, a belt shifter and means for connecting said continually moving part with said belt shifter at a fall in pressure, said means controlled by the pressure produced by the pump.

51. A pressure sustaining device as a subcombination to a hydraulic press, comprising in combination with the cylinder of the press a pump, a conductor between the pump and the said cylinder, means for actuating the belt from the fast to the loose pulley thereof, said means controlled by the pressure produced by the pump and supplemental means for assisting to put the belt actuating means into action comprising a connection between the pressure producing means and the belt actuator and a lock controlling the position of said shifter and whereby the sensitizing of the device is accomplished.

52. A pressure sustaining device, as a subcombination to a hydraulic press comprising in combination with the cylinder of the press, a plunger said plunger subject to the same pressure that is in the cylinder of the press, means for producing pressure in the said cylinder and the said plunger, means controlled by the said plunger for arresting the pressure producing means at a predetermined maximum and a lock for said device, whereby the pressure is sustained and means for operating said lock, as set out.

53. A pressure sustaining device as a subcombination to a hydraulic press having an accumulator chamber, a piston working therein, a weight indicating mechanism controlled by the said piston and auxiliary means to act on said mechanism in the direction contrary to the action of the said piston, whereby the sensitizing of the device is effected.

54. In an automatic press having a hydraulic cylinder, ram and platen, a pressure sustainer and a time recorder for high pressure sustaining, comprising a pump with a fast and loose pulley, a belt shifter, means to automatically and intermittently operate the said belt shifter, an indicator moving mechanism for time pressure recording and a mechanical connection between said belt shifter and said indicator moving mechanism whereby when the belt is on the tight pulley the indicator is stationary but when the pressure is at maximum and the belt is on the loose pulley the indicator is moving.

55. In an automatic press having a compression chamber, ram and platen and a hydraulic cylinder in which the ram is carried, a pump, a conductor between the pump and the said cylinder wherethrough liquid is conducted to produce pressure on the said cylinder during its normal pressing moments and means for returning the said cylinder hydraulically consisting of automatically operated means interposed between said hydraulic cylinder for a normal movement and a return whereby the water or liquid pressure exerts its force in a reverse direction after a predetermined pressure has been reached, as set out.

56. In an automatic hydraulic press having a hydraulic chamber, ram and platen carried by the ram, automatic means to control the action of the ram in its forward or pressing moments, a secondary cylinder also carrying a ram, a mechanical connection between the former ram and the latter, whereby the latter returns the former to its normal position.

In testimony whereof I affix my signature in presence of two witnesses.

HOMER A. HERR.

Witnesses:
WM. H. SMITH,
ELMORE D. BLAKE.

Copies of this patent may be obtained for five cents each, by addressing the "Commissioner of Patents, Washington, D. C."